United States Patent [19]
Koyama et al.

[11] Patent Number: 5,493,412
[45] Date of Patent: Feb. 20, 1996

[54] INFORMATION SIGNAL REPRODUCTION APPARATUS

[75] Inventors: Shinichi Koyama, Tokyo; Nobutoshi Takayama, Kanagawa; Masahito Natsume, Chiba; Eiji Oyama, Kanagawa; Kunio Sakurai, Tokyo; Sakae Hori, Kanagawa, all of Japan

[73] Assignee: Canon Kabushiki Kaisha, Tokyo, Japan

[21] Appl. No.: 80,363

[22] Filed: Jun. 21, 1993

[30] Foreign Application Priority Data

Jun. 25, 1992 [JP] Japan .................... 4-167365

[51] Int. Cl.$^6$ ................ H04N 5/76; H04N 9/79
[52] U.S. Cl. ............... 358/327; 358/328; 358/335; 358/337; 358/340; 358/343; 358/320; 360/33.1; 360/27; 360/25; 360/65; 348/607
[58] Field of Search .................... 358/323, 310, 358/335, 327, 328, 340, 343, 337, 330; 348/607, 609, 624, 625, 519, 539; 360/33.1, 36.1, 38.1, 18, 19.1, 20, 25, 27, 29, 30, 65; H04N 5/76, 5/92, 9/79

[56] References Cited

U.S. PATENT DOCUMENTS

| 4,611,253 | 9/1986 | Kamei et al. | 360/25 |
| 4,956,726 | 9/1990 | Takimoto et al. | 358/310 |
| 5,124,850 | 6/1992 | Kizu | 358/335 |
| 5,257,109 | 10/1993 | Minakawa | 358/310 |
| 5,323,274 | 6/1994 | Muraoka et al. | 360/27 |

FOREIGN PATENT DOCUMENTS 0241227  10/1987  European Pat. Off.

Primary Examiner—Tommy P. Chin
Assistant Examiner—Khoi Truong
Attorney, Agent, or Firm—Robin, Blecker, Daley & Driscoll

[57] ABSTRACT

A video signal processing apparatus is arranged to process a composite information signal which is formed by multiplexing first and second information signals having different frequency bands. When the composite information signal recorded on a recording medium is reproduced, the first information signal is extracted from the reproduced composite information signal and a first detection signal is obtained by subjecting the extracted first information signal to a detection process. The second information signal is also extracted from the reproduced composite information signal and a second detection signal is obtained by subjecting the extracted second information signal to a detection process. The first and second detection signals are compared with each other. A correction process is performed on the composite information signal reproduced from the recording medium according to the result of comparison. The reproduced composite information signal can be adequately corrected by virtue of the arrangement.

6 Claims, 9 Drawing Sheets

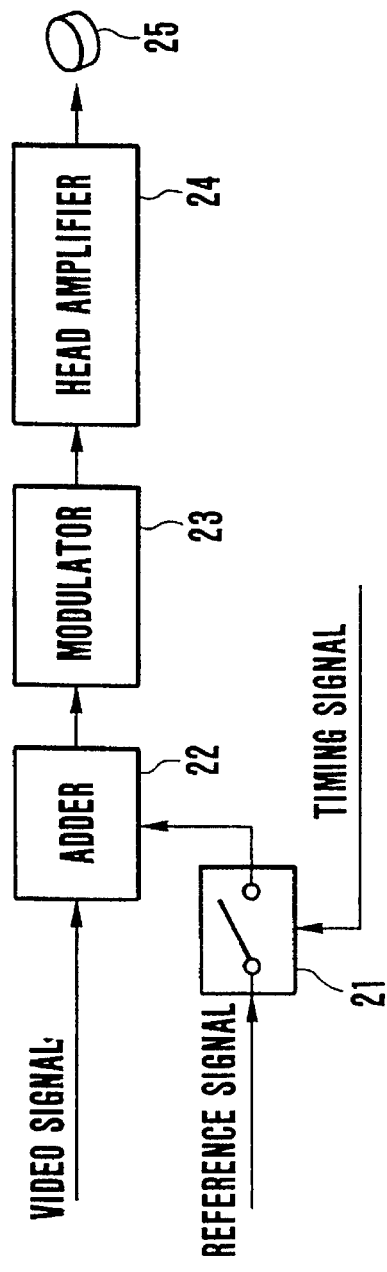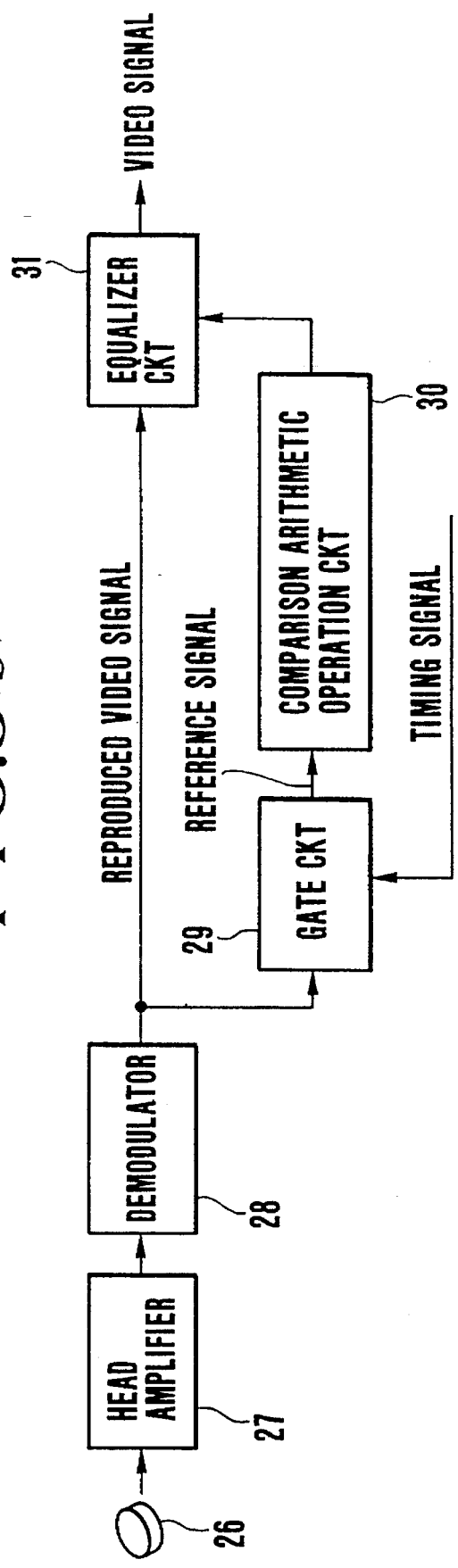

INFORMATION SIGNAL REPRODUCTION APPARATUS

BACKGROUND OF THE INVENTION

1. Field of the Invention

This invention relates to a video signal processing apparatus for processing video signals.

2. Description of the Related Art

FIG. 1 of the accompanying drawings shows in outline the arrangement of the conventional video tape recorder as a video signal processing apparatus. The illustration includes a magnetic tape 1 which is employed as a recording medium, a rotary drum 2, a magnetic head 3 which is mounted on the rotary drum 2, a signal processing circuit 4 arranged to process signals reproduced by the magnetic head 3, a change-over switch 5 arranged to switch the signals outputted from the signal processing circuit 4, a system control circuit 6, an input terminal 8 for receiving an input signal from an external apparatus or the like, an output terminal 9, a display part 10, and an operation part 11 which is provided for instructing the apparatus to perform actions as desired.

With the video tape recorder arranged in this manner, when the operation part 11 is operated to select a reproduction mode, the system control circuit 6 controls the change-over switch 5 to allow a signal reproduced from the magnetic tape 1 to be supplied from the output terminal 9 to the display part (or monitor) 10. In the event of an operation mode other than the reproduction mode, the change-over switch 5 is controlled to allow a signal received from an external apparatus to be supplied via the input terminal 8 to the display part 10. In the case of the reproduction mode, a video signal outputted from the change-over switch 5 is supplied to the display part 10 to have a video image displayed there according to the video signal.

The video tape recorder of the above-stated kind is generally provided with an equalizer circuit for the purpose of correcting the frequency characteristic of a video signal reproduced from the magnetic tape. The equalizer circuit is arranged to correct a frequency characteristic peculiar to the magnetic tape. Reproduced video images can be adequately displayed by virtue of the correcting action of the equalizer circuit. The amount of the frequency characteristic correction by the equalizer is normally predetermined at a fixed value.

Further, in the video tape recorder, the magnetic tape is wrapped more than a half circle around the rotary drum. An information signal such as a video signal is recorded or the record of the information signal is reproduced on or from the magnetic tape by means of the magnetic head which is mounted on the periphery of the rotary drum. The information signal cannot be adequately recorded or reproduced if the magnetic head is not correctly adjusted. Generally, therefore, the magnetic head is variously adjusted at the time of manufacture, etc. The magnetic head adjusting work is done by using a testing magnetic tape and a testing magnetic head.

Further, by specifying the characteristic of the magnetic tape employed as a recording medium, the frequency characteristic of a signal processing action to be carried out at the time of recording and the recording characteristic of the magnetic head, it is practiced to arrange the equalizer circuit to have a predetermined frequency characteristic for correcting into an optimum state a reproduced signal obtained from the magnetic tape at the time of reproduction, and to demodulate the reproduced signal after the frequency characteristic of the signal is corrected by the equalizer circuit.

The conventional video tape recorder is further provided with a noise reduction circuit for lessening a noise component mixed in a video signal reproduced from the magnetic tape. The S/N ratio of the reproduced video signal can be improved by the noise reduction circuit. However, the amount of noise reduction by the noise reduction circuit is fixed and is not variable according to the S/N ratio of the reproduced video signal.

Meanwhile, with the conventional video tape recorder arranged in the above-stated manner as a video signal processing apparatus, for example, as shown in FIG. 1, no signal is obtained from the output terminal 9 in cases where the input terminal 8 has no input signal from an external apparatus or where an instruction for a mode other than the reproduction mode, such as a magnetic tape fast feeding mode or a magnetic tape rewinding mode is given. In such a case, therefore, a video image displayed at the display part 10 teems with noises, which make the video image display highly disagreeable.

Further, in correcting the frequency characteristic of a reproduced video signal by means of the equalizer circuit, unevenness in performance among the magnetic heads causes inconstancy in the frequency characteristic of the reproduced video signal as the amount of correction by the equalizer circuit is fixed to a preset value. As a result, the picture quality of the reproduced video image obtainable on the display part 10 by one video tape recorder varies from the picture quality obtainable by another video tape recorder. Even if the unevenness of the magnetic heads is adjusted at the time of manufacture, the repeated use of the video tape recorder and the secular change such as the wear of the magnetic head, etc., cause some change in the frequency characteristic of the magnetic head, thereby preventing adequate recording and reproduction of video signals.

Further, the unevenness of characteristics among the magnetic heads and the recording media such as magnetic tapes results in variations of the frequency characteristics of signals reproduced from the recording media by different video signal processing apparatuses. Therefore, the use of an equalizer circuit having a single fixed frequency characteristic is apt to be incapable of adequately correcting the frequency characteristic at the time of reproduction. The reproduction characteristic of one video signal processing apparatus thus becomes different from that of another video signal processing apparatus.

Further, as mentioned above, the noise reducible amount by the noise reduction circuit is fixed to a preset value. Therefore, while the reproduced video signal can be improved in S/N ratio, the resolution of details of the picture pattern of the reproduced video image is degraded. It is thus impossible to adjust the picture quality according to the picture pattern of the reproduced video image. Further, the S/N ratio of a reproduced video signal to be outputted from the apparatus is determined by the S/N ratio of the signal reproduced by the magnetic head. It is, therefore, impossible to process the reproduced video signal appositely to the state of the signal for a more agreeable display of the reproduced video image.

SUMMARY OF THE INVENTION

It is a general object of this invention to provide a video signal processing apparatus which is capable of solving the above-stated problems.

It is a more specific object of the invention to provide a video signal processing apparatus which is capable of giving a reproduced video image with a stable picture quality. Under this object, a video signal processing apparatus arranged according to this invention to process video signals comprises recording means for recording a video signal on a recording medium after a reference signal which has a plurality of frequency components for correction of frequency characteristic is added to the video signal, reproducing means for reproducing a signal recorded on the recording medium, extracting means for extracting the reference signal from the signal reproduced by the reproducing means, control signal generating means for generating a control signal for correction of frequency characteristic by comparing a level of each frequency component of the reference signal extracted by the extracting means with a preset value, and frequency characteristic correcting means for correcting, according to the control signal generated by the control signal generating means, a frequency characteristic of a video signal restored from the signal reproduced by the reproducing means.

It is another object of the invention to provide a video signal processing apparatus which is capable of giving a reproduced video image with a stable picture quality without being affected by the secular change of a rotary magnetic head. Under that object, a video signal processing apparatus arranged according to this invention to process video signals comprises, a rotary magnetic head arranged to record a video signal on a magnetic tape or to reproduce the recorded video signal from the magnetic tape, a fixed magnetic head disposed in a position where the fixed magnetic head can be magnetically coupled with the rotary magnetic head, and video signal correcting means arranged to detect a characteristic of the rotary magnetic head by exchanging a testing signal between the rotary magnetic head and the fixed magnetic head and to correct, according to the detected characteristic of the rotary magnetic head, a video signal to be recorded on the magnetic tape or a video signal reproduced from the magnetic tape.

It is a further object of the invention to provide a video signal processing apparatus which is arranged to be capable of adaptively performing a signal processing action according to the state of a composite information signal and is thus arranged to obtain a stable composite information signal. Under this object, a video signal processing apparatus which is arranged according to this invention to process a composite information signal formed by multiplexing a first information signal and a second information signal having a different frequency band from the first information signal comprises reproducing means for reproducing the composite information signal recorded on a recording medium, first detection means arranged to extract the first information signal from the composite information signal reproduced from the recording medium by the reproducing means, to perform a detecting action on the extracted first information signal and to output a first detection signal, second detection means arranged to extract the second information signal from the composite information signal reproduced from the recording medium by the reproducing means, to perform a detecting action on the extracted second information signal and to output a second detection signal, comparison means for making a comparison between the first detection signal and the second detection signal, and correcting means for performing a correcting process on the composite information signal reproduced from the recording medium by the reproducing means according to a result of the comparison made by the comparison means.

These and other objects and features of this invention will become apparent from the following detailed description of embodiments thereof taken in connection with the accompanying drawings.

BRIEF DESCRIPTION OF THE DRAWINGS

FIGS. 3(a) and 3(b) show in outline a video signal processing apparatus arranged according to this invention as a second embodiment thereof.

DETAILED DESCRIPTION OF THE PREFERRED EMBODIMENTS

Figure 1:
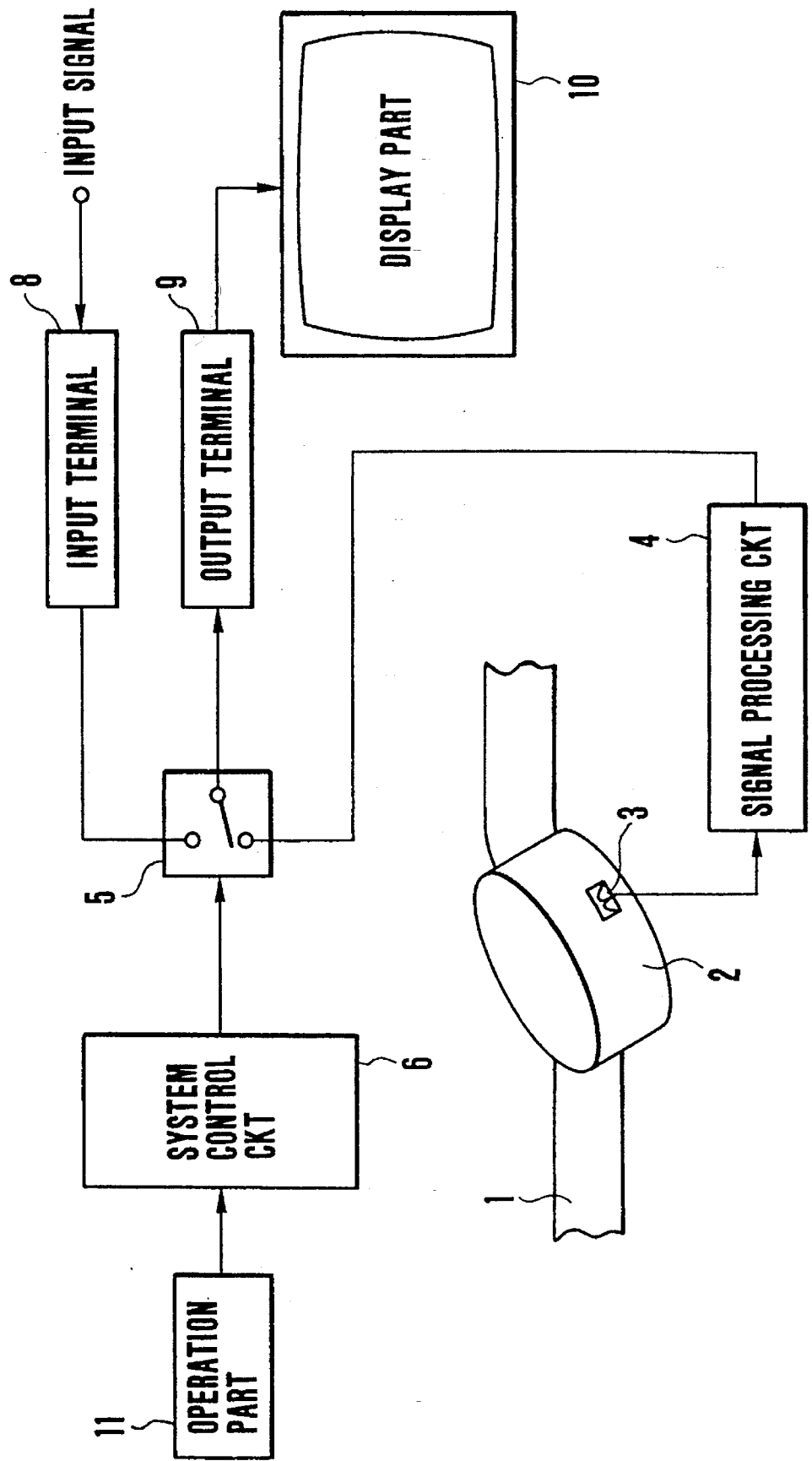
FIG. 1 shows in outline the arrangement of the conventional video signal processing apparatus.
Figure 2:
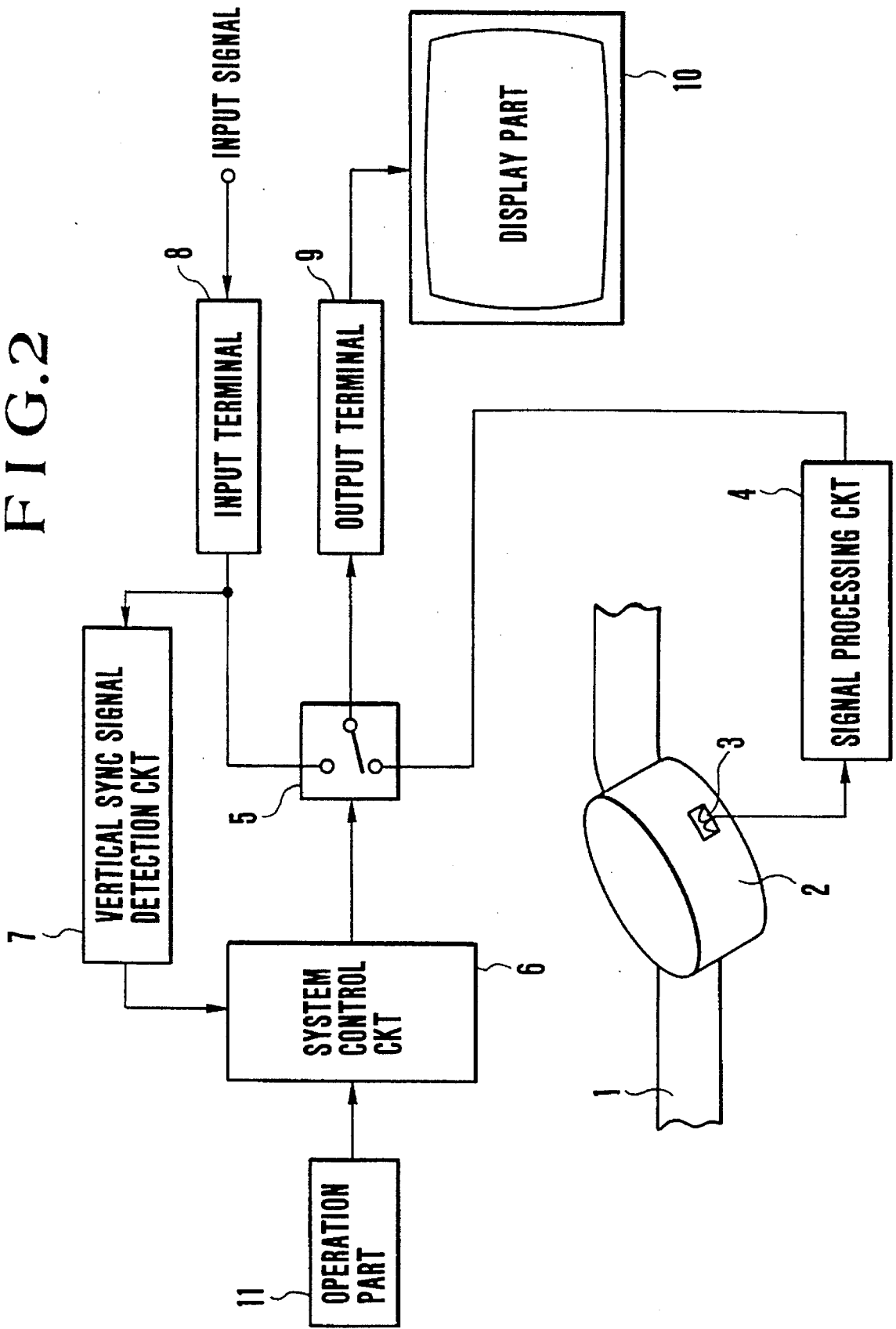
FIG. 2 shows in outline the arrangement of a video Signal processing apparatus arranged according to this invention as a first embodiment thereof.

FIG. 2 shows in outline the arrangement of a video signal processing apparatus arranged as a first embodiment of this invention. In FIG. 2, parts arranged in the same manner as those shown in FIG. 1 are indicated by the same reference numerals. The illustration includes a magnetic tape 1, a rotary drum 2, a magnetic head 3, a signal processing circuit 4 which is arranged to process a signal reproduced by the magnetic head 3, a change-over switch 5, a system control circuit 6 arranged to control the switching action of the change-over switch 5, a vertical synchronizing (hereinafter referred to as sync) signal detection circuit 7 arranged to detect the presence or absence of an input signal, an input terminal 8 for receiving an input signal, an output terminal 9 for outputting a signal, a display part 10, and an operation part 11 provided for instructing the apparatus to perform various actions.

The embodiment operates as described below:

When one of keys provided at the operation part 11 is operated for fast feeding or rewinding the magnetic tape 1, the magnetic head 3 reproduces signals recorded on the magnetic tape 1 in a fast tape feeding mode or in a tape rewinding mode. At this time, the presence or absence of an input signal at the input terminal 8 is determined by the vertical sync signal detection circuit 7. If no vertical sync signal is detected by the vertical sync signal detection circuit 7, the system control circuit 6 is informed that there is no input video signal at the input terminal 8 from an external apparatus. In this instance, the system control circuit 6 connects the change-over switch 5 to its one side for the signal processing circuit 4. With the change-over switch 5 thus operated, the reproduced signal which is obtained by the magnetic head 3 from the magnetic tape 1 and processed by the signal processing circuit 4 is supplied to the display part 10.

This action allows a reproduced video image to be displayed by the display part 10 even in the event of fast feeding or rewinding the magnetic tape 1. Therefore, the contents of the video signals recorded on the magnetic tape 1 can be confirmed without difficulty both in the fast tape feeding mode or in the tape rewinding mode. The image sighting at the display part 10 is thus facilitated to permit an adequate processing action on the reproduced signal as desired. Further, in a case where there is an input video signal from an external apparatus, the video image carried by the video signal is displayed by the display part 10.

The vertical sync signal detection circuit 7 may be replaced with a detector which is arranged to detect the connected state of the input terminal 8. In this instance, unlike the embodiment described, a check is made to find if the input terminal 8 is connected to an external apparatus instead of making a discrimination between the presence and absence of an input video signal from the external apparatus. Further, a display change-over switch may be disposed in place of the vertical sync signal detection circuit 7. In that instance, the video signal processing apparatus is arranged to permit selection of a video signal reproduced from the magnetic tape or a video signal inputted from the external apparatus as desired by operating this display change-over switch and to cause the display part 10 to make a display of the selection.

Further, the change-over switch 5 may be changed to be capable of having three different input signals and to operate as follows: In a case where no reproduced video signal is coming from the magnetic tape 1, some other video signal which is arranged beforehand may be outputted. In this case, for example, a digital memory which stores video signals or a character generator may be used as a video signal generator for generating some other video signal. The video signal generator to be used for this purpose is generally provided for generating a video signal to be superimposed on the reproduced video signal obtained from the magnetic tape 1.

The embodiment has been described as arranged to simply display the video signal reproduced from the magnetic tape 1 by the magnetic head 3. However, the embodiment may be arranged to adjust the relative speeds of the magnetic tape 1 and the magnetic head 3 and to perform tracking control for a stable display of the reproduced video images.

FIGS. 3(a) and 3(b) show in outline a video signal processing apparatus arranged according to this invention as a second embodiment thereof. FIG. 3(a) shows the arrangement of a recording system of the video signal processing apparatus. FIG. 3(b) shows the arrangement of a reproduction system of the same video signal processing apparatus. Referring to FIG. 3(a), a switch circuit 21 is arranged to receive a reference signal which has a plurality of frequency components for automatic correction of frequency characteristic and to output the reference signal at a timing defined by a timing signal supplied to the switch circuit 21. A part of the reference signal inputted only during a specific period within the vertical blanking period of a video signal is outputted from the switch circuit 21 according to the timing signal. An adder 22 is arranged to add the reference signal outputted from the switch circuit 21 to the video signal. A modulator 23 is arranged to frequency-modulate the video signal to which the reference signal has been added. A head amplifier 24 is arranged to amplify the output of the modulator 23. The amplified signal is recorded by a magnetic head 25 on a magnetic tape which is not shown.

Referring to FIG. 3(b), a magnetic head 26 is arranged to reproduce a video signal recorded on a magnetic tape which is not shown. A head amplifier 27 is arranged to amplify the signal reproduced by the head 26. A demodulator 28 is arranged to demodulate the amplified signal. A gate circuit 29 is arranged to operate in accordance with a timing signal to extract, from the demodulated video signal, the reference signal added to the video signal at the time of recording in the manner as mentioned above. A comparison arithmetic operation circuit 30 is arranged to compare the level of each frequency component of the reference signal extracted by the gate circuit 29 with a preset value and to generate a control signal for automatically correcting the frequency characteristic of the reproduced video signal. With each of the frequency components of the extracted reference signal compared with the preset value, a signal corresponding to a difference from the preset value thus obtained is outputted as the control signal from the comparison arithmetic operation circuit 30. In accordance with this control signal, an equalizer circuit 31 corrects the frequency characteristic of the reproduced video signal outputted from the demodulator 28.

The second embodiment operates as follows: During recording, a system control circuit which is not shown supplies a timing signal to the switch circuit 21 of FIG. 3(a) only for a specific period within the vertical blanking period of the video signal. The switch circuit 21 is turned on to output the frequency characteristic correcting reference signal only during this specific period. The reference signal is supplied to the adder 22 to be added to the video signal. After that, the video signal is frequency-modulated by the modulator 23. The modulated video signal is amplified by the head amplifier 24. The magnetic head 25 then records the amplified video signal on the magnetic tape which is not shown.

In the case of reproduction, the signal recorded on the magnetic tape which is not shown is reproduced by the magnetic head 26. The reproduced signal is amplified by the head amplifier 27. The amplified signal is demodulated by the demodulator 28. The demodulated signal is supplied as a reproduced video signal to the gate circuit 29 and the equalizer circuit 31.

The reference signal included in the reproduced video signal inputted to the gate circuit 29 is extracted from the reproduced video signal by gating the video signal inputted according to the timing signal, with the exception of the period for which the reference signal is added within the vertical blanking period of the video signal. The reference signal thus extracted is supplied to the comparison arithmetic operation circuit 30. The circuit 30 then compares the level of each of the frequency components of the reference signal with a preset value. As a result, a signal corresponding to a difference between the level of each frequency component of the reference signal and the preset value is outputted as the control signal for automatic correction of the frequency characteristic of the reproduced video signal from the circuit 30.

In accordance with the control signal from the comparison arithmetic operation circuit 30, the frequency characteristic of the reproduced video signal inputted to the equalizer circuit 31 is automatically corrected by the equalizer circuit 31 to be outputted as a frequency-characteristic-corrected reproduced video signal. In other words, even if the frequency characteristic of the magnetic head 26 is inconstant, the amount of correction of the frequency characteristic of the reproduced video signal is automatically controlled in accordance with the control signal which is formed by the comparison arithmetic operation circuit 30 according to variations in frequency characteristic of the signal reproduced by the magnetic head 26. As a result, the reproduced video signal outputted from the equalizer circuit 31 has little inconstancy in its frequency characteristic. Therefore, variations in picture quality among reproduced video images obtained from a video signal reproduced by different apparatuses can be lessened as the frequency characteristic of the reproduced video signal can be stabilized irrespectively of the unevenness and inconstancy in frequency characteristic of the magnetic heads of the apparatuses.

In a case where the level of the reference signal outputted from the gate circuit 29 is found to be lower by more than a given amount than the level of the preset value through the comparison made by the comparison arithmetic operation circuit 30, a given control signal is outputted to cause the equalizer circuit 31 to correct the reproduced video signal in accordance with a preset amount of frequency characteristic correction. In other words, the equalizer circuit 31 is arranged such that, in cases where no reference signal is found to have been added to the video signal reproduced from the magnetic tape, the equalizer circuit 31 corrects the reproduced video signal according to a preset frequency characteristic correcting amount.

As described above, the reference signal for automatic correction of frequency characteristic is added to a video signal in recording the video signal on a magnetic tape. In reproducing the video signal from the magnetic tape, the reference signal added to the video signal is extracted. Then, the frequency characteristic of the reproduced video signal is automatically corrected according to the level of each of the different frequency components of the reference signal extracted. Therefore, the embodiment gives a reproduced video signal which has a stable frequency characteristic irrespective of any inconstancy in frequency characteristic of the magnetic head. In accordance with the arrangement of the second embodiment, therefore, the variations in picture quality among video images obtainable from a reproduced video signal by different video signal processing apparatuses can be lessened by appositely processing the reproduced video signal. The video image display made by the embodiment thus can be agreeably seen.

Figure 4:
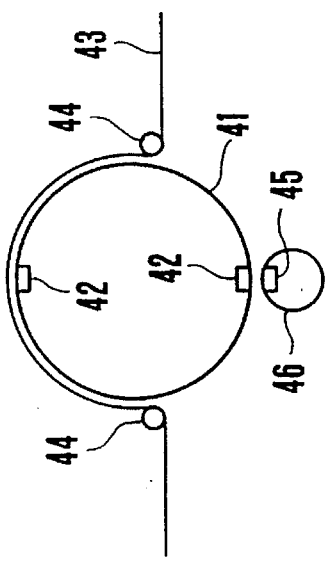
FIG. 4 shows in outline the arrangement of a video signal processing apparatus arranged according to this invention as a third embodiment thereof.

FIG. 4 shows in outline the arrangement of a video signal processing apparatus arranged as a third embodiment of this invention. The illustration of the third embodiment includes a rotary drum 41, recording/reproducing magnetic heads 42 which are mounted on the periphery of the rotary drum 41, a magnetic tape 43 which is employed as a recording medium and is guided by tape guides 44 to be wrapped more than a half circle around the periphery of the rotary drum 41, a fixed magnetic head 45 which is arranged at a position where it never comes into contact with the magnetic tape 43 and is magnetically coupled with the magnetic heads 42, and a post 46 which is fixed to the body of the apparatus and has the fixed magnetic head 45 mounted on the periphery thereof.

Figure 5:
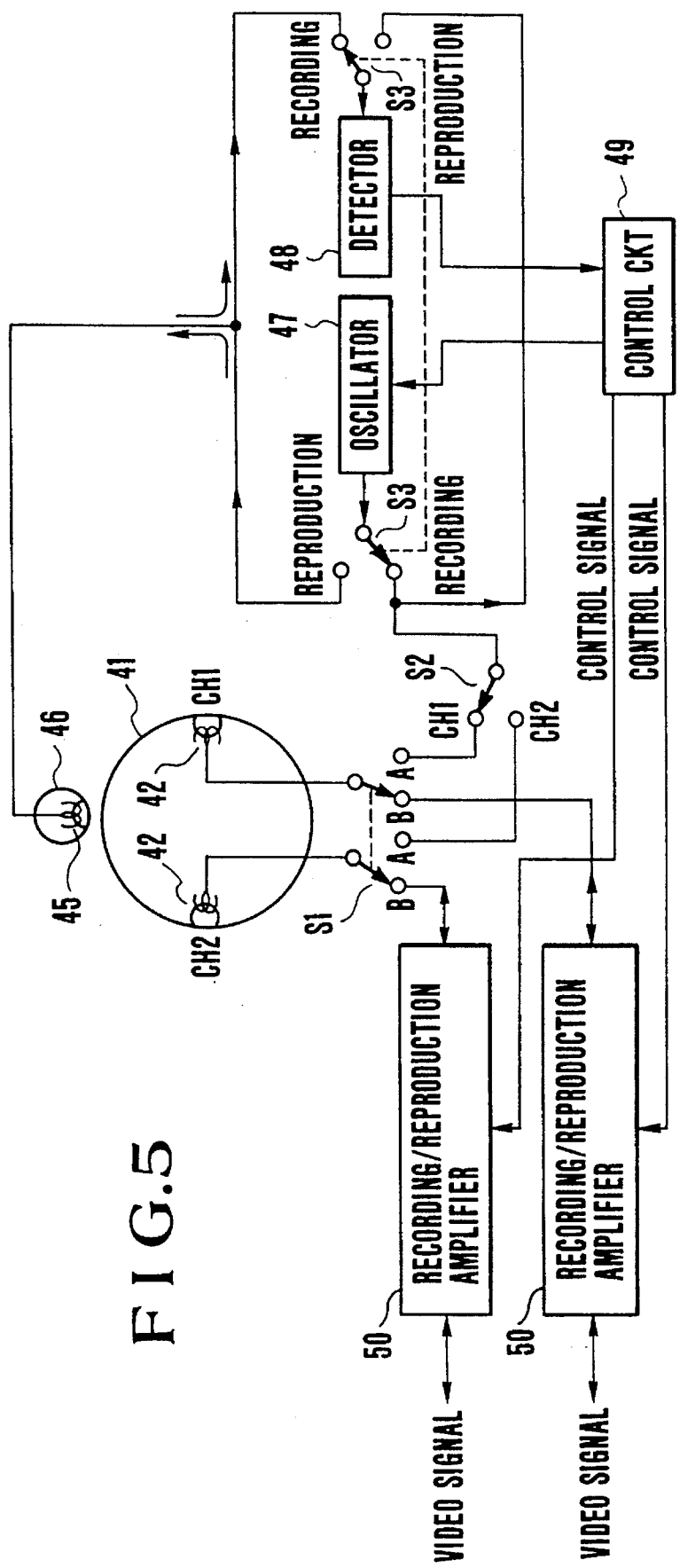
FIG. 5 shows the circuit arrangement of the apparatus shown in FIG. 4 as the third embodiment.

FIG. 5 shows the circuit arrangement of the third embodiment shown in FIG. 4. In FIG. 5, the same component parts as those shown in FIG. 4 are indicated by the same reference numerals. Referring to FIG. 5, an oscillator 47 is arranged to output a testing signal for detecting the magnetic characteristic of each of the two magnetic heads 42. A detector 48 is arranged to detect the testing signal. A control circuit 49 is arranged to adjust a video signal to be recorded on the magnetic tape 43 or a video signal reproduced from the magnetic tape 43. The control circuit 49 adjusts the video signal by detecting the magnetic characteristic of each of the magnetic heads 42 by exchanging the above-stated testing signal between each of the magnetic heads 42 (channel CH1 or CH2) and the fixed magnetic head 45. More specifically, the control circuit 49 is arranged to supply a video signal adjusting control signal to each of two recording/reproduction amplifiers 50 provided for the magnetic heads 42, in accordance with the testing signal outputted from the detector 48, and to control adjustment of level of the video signal at the time of recording or reproduction.

Further, referring to FIG. 5, a change-over switch. S1 is arranged to have its connecting position on one side B for recording and reproduction and on another side A for detecting the magnetic characteristics of the magnetic heads 42. For normal recording and reproduction, the switch S1 connects the magnetic heads 42 to the recording/reproduction amplifiers 50. A change-over switch S2 is arranged to shift its connecting position between two sides CH1 and CH2 for the magnetic heads 42 in detecting their magnetic characteristics. A change-over switch S3 is arranged to shift its connecting position between a recording circuit and a reproduction circuit in detecting the magnetic characteristics of the magnetic heads 42.

The third embodiment operates as follows: In detecting the magnetic characteristics of the magnetic heads 42, the control circuit 49 connects the switch S1 on its side A and allows the oscillator 47 to output the testing signal as desired. In a case where the recording system circuit is to be adjusted through the change-over switch S3, the testing signal is applied to the magnetic heads 42 through the change-over switch S2. The testing signal then comes to the detector 48 through the magnetic heads 42 and the fixed magnetic head 45. In adjusting the reproduction system circuit, the testing signal is applied to the fixed magnetic head 45 and comes to the detector 48 through the fixed magnetic head 45, the magnetic heads 42 and the change-over switch S2.

The testing signal inputted to the detector 48 is subjected to a detection process and is then supplied to the control circuit 49. At the control circuit 49, information on magnetic characteristics of the magnetic heads 42 such as changes taking place in frequency and amplitude, etc., at the time of recording and reproduction is detected. Then, on the basis of the information detected, the control circuit 49 generates a control signal for adjusting the amplifying characteristic of each of the recording/reproduction amplifiers 50. The amplifying characteristic of each of the recording/reproduction amplifiers 50 is thus controlled to be always adjusted to an optimum characteristic.

The third embodiment is thus arranged to detect the magnetic characteristics of the magnetic heads 42 and to be capable of automatically adjusting the amplifying characteristics of the the recording/reproduction amplifiers 50 to the optimum state according to the detected magnetic characteristics of the magnetic heads 42. Even in the event of occurrence of wear or a secular change of the magnetic heads 42, the embodiment is capable of always adequately recording or reproducing video signals. The adequate signal processing action results in a video image display which can be agreeably seen.

In accordance with the arrangement of the third embodiment, the fixed magnetic head 45 does not have to be disposed in a position to be physically coming into contact with the magnetic heads 42 as long as they can be magnetically coupled with each other. Therefore, the fixed magnetic head 45 does not wear out nor have any secular change. Therefore, since amplifying characteristics of the recording/ reproduction amplifiers 50 can be corrected in relation to the secular changes of the magnetic heads 42 as mentioned above, the apparatus is not readily affected by any secular changes, so that a stable performance of the apparatus can be attained.

The embodiment described above is arranged to be capable of automatically adjusting both of the circuit of a recording system and that of the reproduction system. However, the arrangement may be changed to automatically adjust only the circuit of the recording system or that of the reproduction system in cases where the arrangement is not desirable in terms of cost or impossible due to the limited space of the circuit board. Further, the embodiment uses two magnetic heads 42. However, the invented arrangement is applicable also to an apparatus having three or more magnetic heads by increasing the number of contacts of the change-over switch S2 accordingly.

Figure 6:
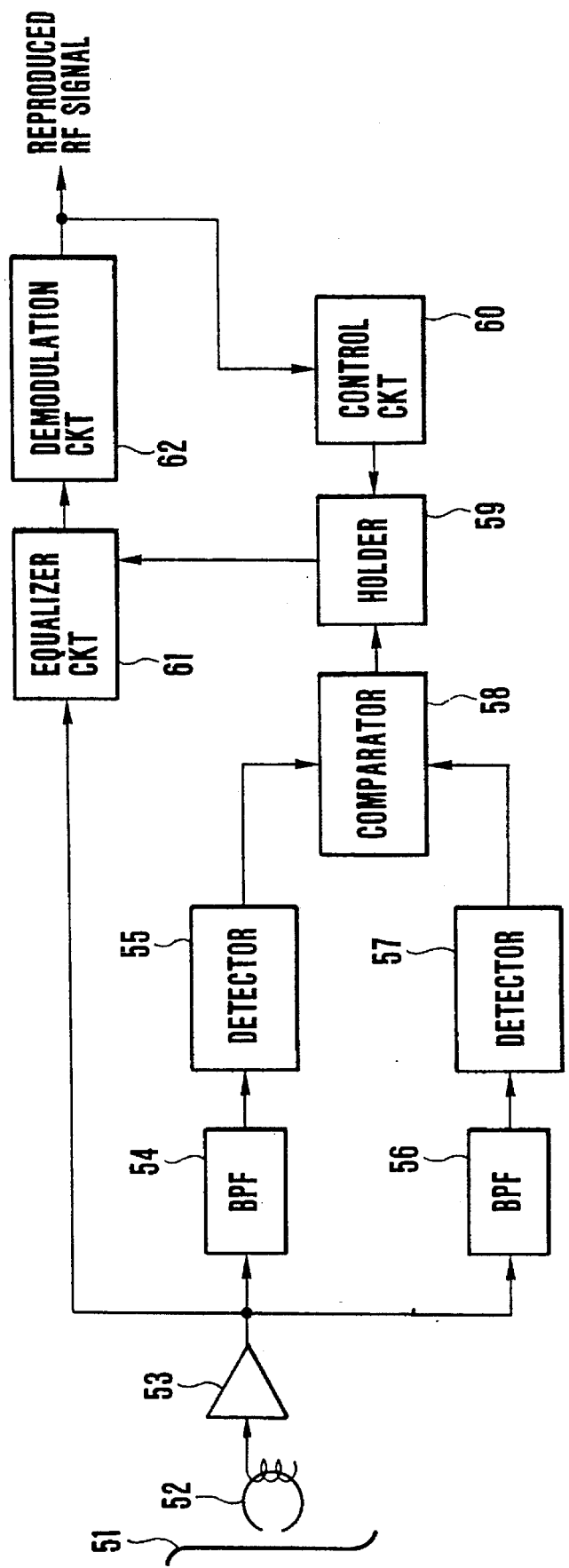
FIG. 6 shows in outline the arrangement of a video signal processing apparatus arranged according to this invention as a fourth embodiment thereof.

FIG. 6 is a block diagram showing in outline the arrangement of a video signal processing apparatus which is arranged as a fourth embodiment of this invention. The fourth embodiment is described as follows:

Referring to FIG. 6, a composite signal formed by mixing a frequency-modulated luminance signal, a low-converted chrominance signal and a frequency-modulated audio signal is recorded on a magnetic tape 51 which is employed as a recording medium. The illustration includes a magnetic head 52, an amplifier 53, a band-pass filter 54 arranged to extract the frequency-modulated luminance signal from the signal outputted from the amplifier 53, a detector 55 arranged to detect the signal outputted from the band-pass filter 54 and to output a signal corresponding to the level of the luminance signal, a band-pass filter 56 arranged to extract the frequency-modulated audio signal from the signal outputted from the amplifier 53, a detector 57 arranged to detect the signal outputted from the band-pass filter 56 and to output a signal corresponding to the level of the audio signal, a comparator 58 arranged to compare the levels of the detection outputs of the detectors 55 and 57 and to output a control signal, a holder 59 arranged to hold the output of the comparator 58, a control circuit 60 arranged to control the holding action of the holder 59, and an equalizer circuit 61 which is arranged to have its frequency characteristic variable according to the output of the holder 59 and to correct the frequency characteristic of the signal outputted from the amplifier 53. A demodulation circuit 62 is arranged to demodulate the signal outputted from the equalizer circuit 61.

The video and audio information signals recorded on the magnetic tape 51 are processed through the magnetic head 52, the amplifier 53, the equalizer circuit 61 and the demodulation circuit 62 to be restored as a reproduced signal (hereinafter this reproduced signal is referred to as the reproduced RF signal).

The band-pass filter 54 extracts the frequency-modulated luminance signal from the output of the amplifier 53. The output of the band-pass filter 54 is subjected to a detection process at the detector 55. The output of the detector 55 is supplied to the comparator 58 as a signal indicating changes taking place in the level of the frequency-modulated luminance signal. Meanwhile, the band-pass filter 56 extracts the frequency-modulated audio signal from the output of the amplifier 53. The output of the band-pass filter 56 is subjected to a detection process at the detector 57. The output of the detector 57 is supplied to the comparator 58 as a signal indicating changes taking place in the level of the frequency-modulated audio signal. The comparator 58 compares these input signals received from the detectors 55 and 57 and forms a control signal indicating a value which corresponds to a level ratio between these input signals. The control signal is supplied to the holder 59. The control circuit 60 then controls the holder 59 in such a way as to hold a value indicated by the control signal outputted from the comparator 58 for the period of the sync tip of a sync signal included in the reproduced RF signal. The equalizer circuit 61 is thus controlled in such a way as to have the level ratio between the frequency-modulated luminance signal and the frequency-modulated audio signal obtained during the sync tip period of the sync signal included in the reproduced RF signal at a given value by variably controlling the frequency characteristic of the equalizer circuit 61 according to the value indicated by the control signal held and outputted from the holder 59.

With the fourth embodiment arranged as described above, the reproduced signal having a constant frequency characteristic is supplied to the demodulation circuit 62 irrespective of the inconstancy of the characteristics of the magnetic tape 51, the magnetic head 52 and the amplifier 53. As a result, the reproduced RF signal is obtained with its frequency characteristic adequately corrected. The reproduced signal thus can be adequately processed by the embodiment.

While the fourth embodiment has been described as having only one magnetic head 52 and only one amplifier 53, the same advantageous effect as the embodiment can be attained by applying the invented arrangement described to such an apparatus that has a plurality of magnetic heads and a plurality of amplifiers and is arranged to continuously obtain the reproduced RF signal by switching the use of them from one over to another.

Further, the arrangement shown in FIG. 6 may be changed as follows: The band-pass filter 56 may be arranged to extract the low-converted chrominance signal. The detector 57 may be arranged to detect the chrominance signal. The control circuit 60 may be arranged to control the holder 59 in such a way as to hold the value indicated by the control signal outputted from the comparator 58 for a blanking period corresponding to the back porch of a horizontal sync signal included in the reproduced RF signal. A modification arranged in this manner will give the same advantageous effect as the fourth embodiment.

In other words, in the case of the modification, the frequency characteristic of the equalizer circuit 61 is variably controlled according to the value indicated by the control signal held and outputted by the holder 59 in such a way as to have the level ratio between the frequency-modulated luminance signal and the low-converted chrominance signal at a given value during the blanking period corresponding to the back porch of the horizontal sync signal. By this control, a reproduced signal of a constant frequency characteristic can be supplied to the demodulation circuit 62.

The arrangement described above enables the embodiment to adequately make compensation for the inconstancy and variations or unevenness in frequency characteristic of the apparatus, so that the reproduced RF signal can be obtained in an adequate state. Further, the invented arrangement gives a wider range of tolerance for the inconstancy and unevenness of the magnetic tape and the magnetic head. The wider tolerance range permits a reduction in cost of parts. Further, the design of the demodulation circuit can be simplified as the frequency characteristic of the reproduced signal outputted from the equalizer circuit is corrected before the reproduced signal is supplied to the demodulation circuit.

Figure 7:
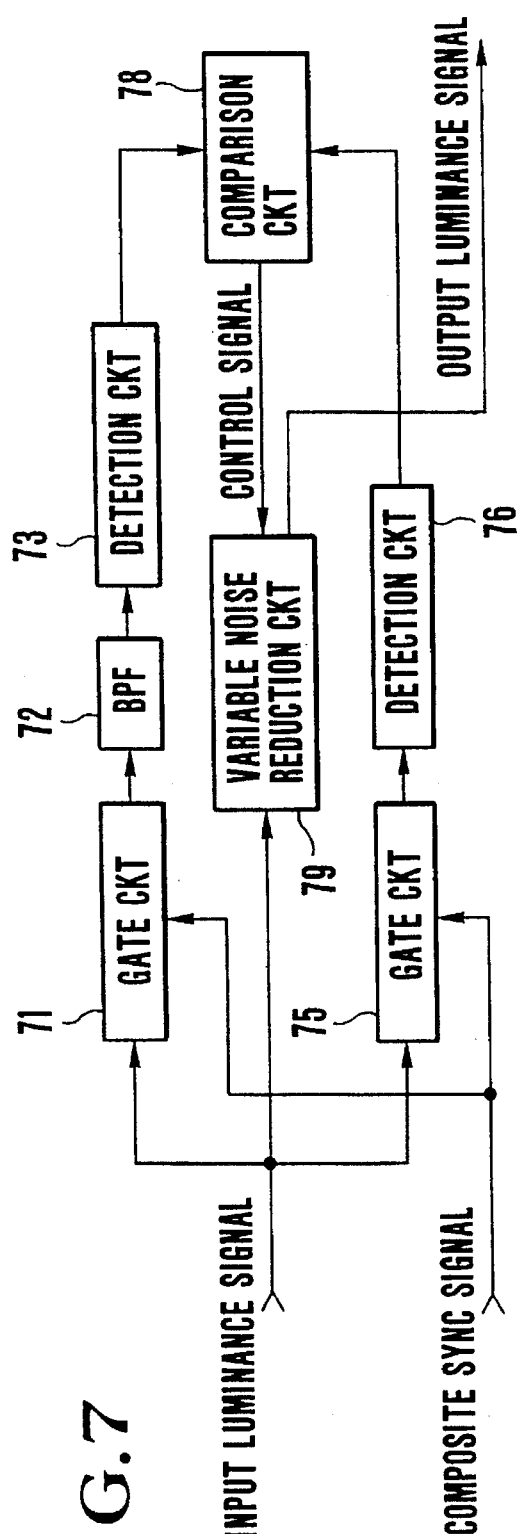
FIG. 7 shows in outline the arrangement of a video signal processing apparatus arranged according to this invention as a fifth embodiment thereof.

FIG. 7 is a block diagram showing in outline the arrangement of a video signal processing apparatus which is arranged as a fifth embodiment of this invention. Referring to FIG. 7, with a luminance signal separated from an input video signal, a gate circuit 71 is arranged to extract a part of the luminance signal excluding a sync signal included in the luminance signal. A band-pass filter (hereinafter referred to as BPF) 72 is arranged to extract from the luminance signal a signal for a frequency component corresponding to a fine picture pattern of a video image. A detection circuit 73 is arranged to detect the output of the BPF 72 and to output a signal for a DC component of the output of the BPF 72. A gate circuit 75 is arranged to extract only a sync signal part of the luminance signal. A detection circuit 76 is arranged to detect the output of the gate circuit 75 and to output a signal for a DC component. A comparison circuit 78 is arranged to compare the outputs of the detection circuits 73 and 76 and to output a control signal of a level corresponding to the result of comparison. A variable noise reduction circuit 79 is arranged to have its noise reducing amount for the luminance signal controlled in accordance with the control signal outputted from the comparison circuit 78.

Figure 8:
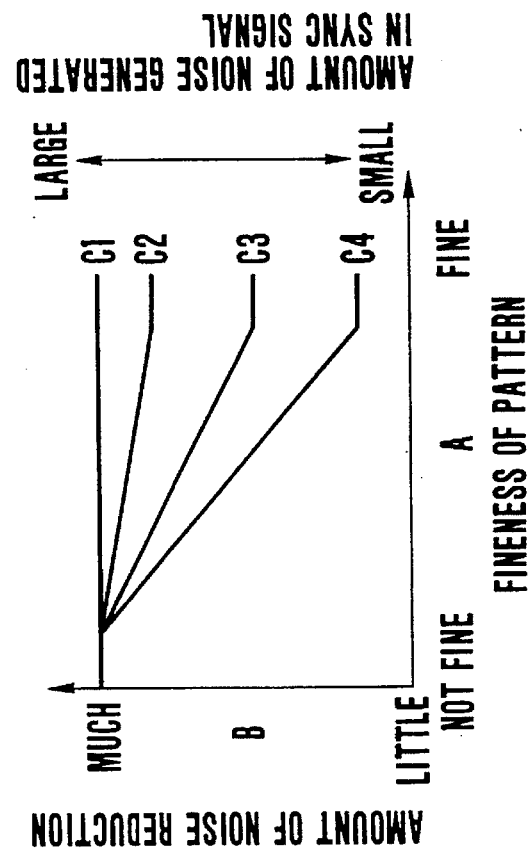
FIG. 8 shows the operation characteristic of a comparison circuit of the apparatus shown in FIG. 7.

FIG. 8 shows the operation characteristic of the comparison circuit 78. The comparison circuit 78 is arranged to compare the output level of the detection circuit 73 which represents the fineness of the picture pattern of the video image (A in FIG. 8) with the output level of the detection circuit 76 which represents an amount of noise taking place in the sync signal (one of amounts C1 to C4 shown in FIG. 8). As a result of comparison, the comparison circuit 78 outputs the control signal in such a way as to obtain an apposite amount B of noise reduction by variably controlling the variable noise reduction circuit 79.

Figure 9:
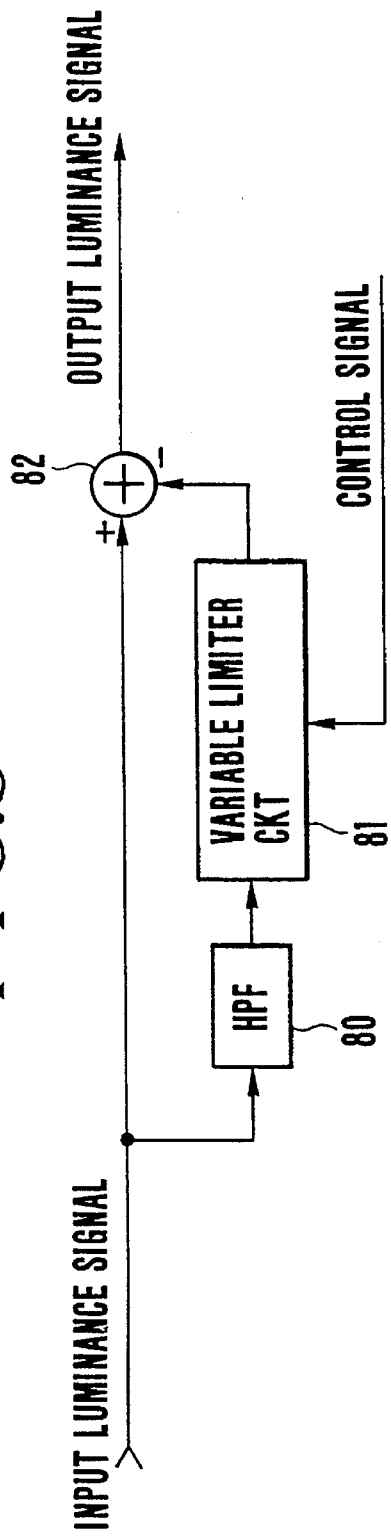
FIG. 9 is a block diagram showing by way of example the arrangement of a variable noise reduction circuit of the apparatus shown in FIG. 7.

FIG. 9 shows one example of arrangement of the variable noise reduction circuit 79 shown in FIG. 7. The circuit 79 consists of a high-pass filter (hereinafter referred to as HPF) 80, a variable limiter circuit 81 and an adder 82. The variable noise reduction circuit 79 is arranged to reduce the noise component of the input luminance signal by subtracting the output of the variable limiter circuit 81 from the input luminance signal.

Figure 10:
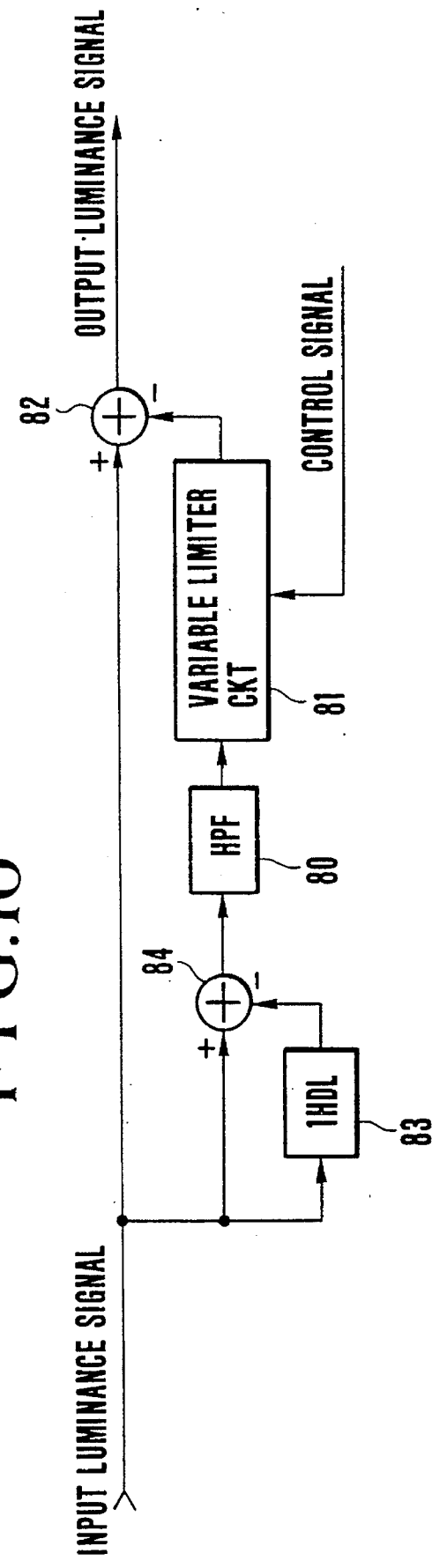
FIG. 10 is a block diagram showing another example of the arrangement of the variable noise reduction circuit of the apparatus shown in FIG. 7.

FIG. 10 shows another example of the variable noise reduction circuit 79. In the case of FIG. 10, a one-horizontal sync period delay circuit (hereinafter referred to as 1HDL circuit) 83 and an adder 84 are disposed before the HPF 80 shown in FIG. 9. In this case, the noise component is detected by subtracting the output of the 1HDL (delay) circuit 83 from the input luminance signal. The output of the adder 84 is inputted to the variable limiter circuit 81 after the frequency band of the noise component is limited through the HPF 80. The noise component is reduced by subtracting the output of the variable limiter circuit 80 from the input luminance signal.

The circuit arrangement of the fifth embodiment shown in FIG. 7 operates in the following manner:

A luminance signal separated from an input video signal and a composite sync signal are supplied to each of the gates circuits 71 and 75. The gate circuit 71 extracts a part of the luminance signal excluding the sync signal. The frequency band of the extracted signal is limited further by the BPF 72. The output of the BPF 72 is supplied to the detection circuit 73. Meanwhile the other gate circuit 75 extracts only the sync signal part from the luminance signal. The extracted signal is supplied to the detection circuit 76.

The output of the detection circuit 73 is a signal indicating the fineness of a video image. The output of the other detection circuit 76 is a signal which indicates the level of a noise component taking place in the sync signal part. These signals are supplied to the comparison circuit 78 to be compared with each other. The comparison circuit 78 outputs a control signal according to the result of comparison. The control signal is supplied to the variable noise reduction circuit 79. Upon receipt of the control signal, the variable noise reduction circuit 79 changes the reducing amount of the noise in the luminance signal according to the control signal. The noise reduction amount is thus controlled in an optimum manner according to the fineness of the picture pattern of the video image carried by the input luminance signal and the S/N ratio of the input luminance signal. As a result, an output luminance signal is obtained with its noise component having been reduced by an optimum noise reduction amount. Referring to FIG. 8, in this instance, the comparison circuit 78 performs a control process for varying the noise reduction amount according to the output signal levels of the detection circuits 73 and 76 in a manner as described below:

a) In a case where the output signal level of the detection circuit 73 is higher than a given level and the output signal level of the detection circuit 76 is lower than a given level, the comparison circuit 78 outputs a control signal for lessening the noise reduction amount.

b) If the output signal level of the detection circuit 73 is lower than the given level, the comparison circuit 78 outputs a control signal for increasing the noise reduction amount for improvement in S/N ratio of the luminance signal irrespective of the output signal level of the other detection circuit 76.

c) If the output signal level of the detection circuit 76 is higher than the given level, the comparison circuit 78 outputs a control signal for increasing the noise reduction amount for improvement in S/N ratio of the luminance signal irrespective of the output signal level of the detection circuit 73.

With the noise reduction amount of the variable noise reduction circuit 79 arranged to be controlled by the control signal in the above-stated manner, the picture quality of the video image display can be changed by controlling the noise reduction amount according to the fineness of the picture pattern of the video image carried by the input luminance signal. By virtue of this control, the details of the picture pattern of the video image display can be prevented from deteriorating. Another advantage of the embodiment lies in that a video signal having an adequate S/N ratio can be outputted by the apparatus independently of a video signal inputted.

Figure 11:
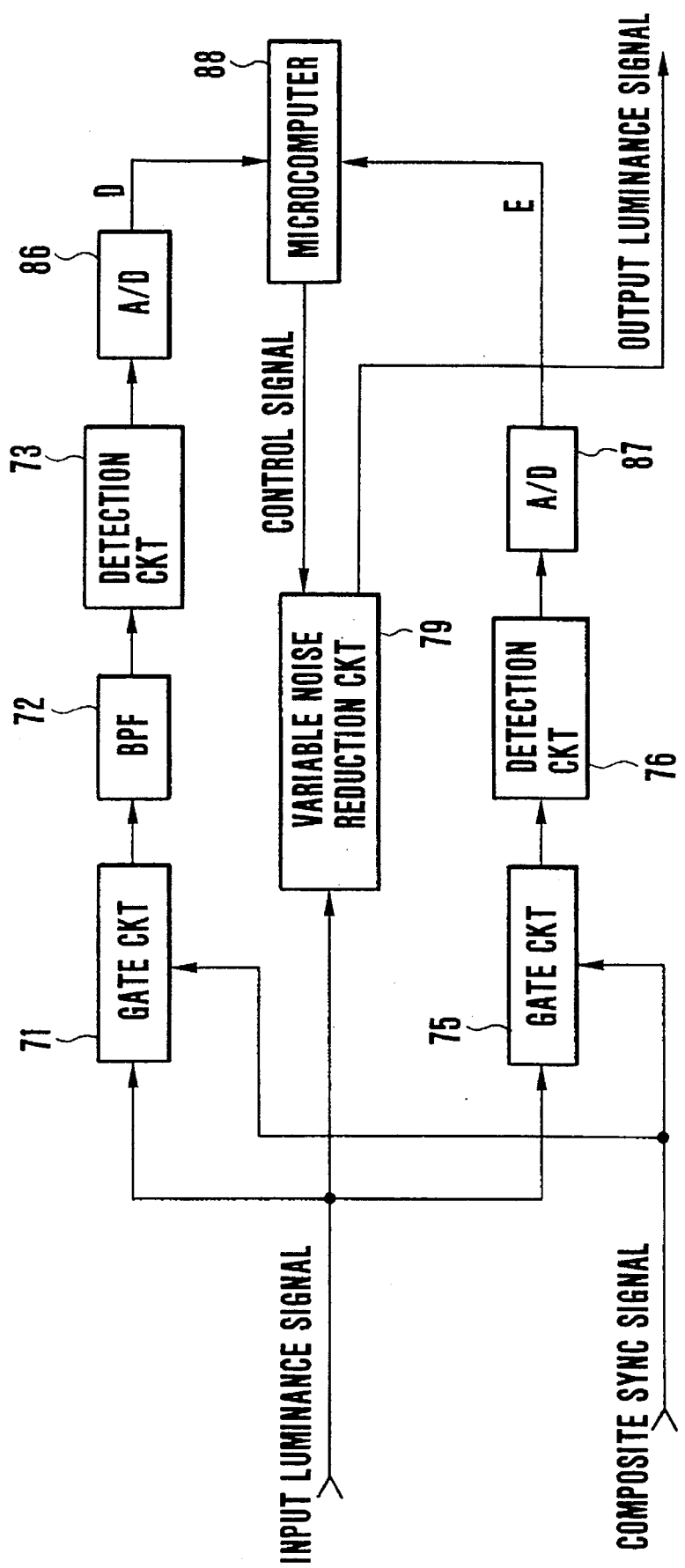
FIG. 11 shows in outline the arrangement of a video signal processing apparatus arranged according to this invention as a sixth embodiment thereof.

FIG. 11 is a block diagram showing in outline the arrangement of a video signal processing apparatus arranged as a sixth embodiment of this invention. The sixth embodiment is arranged as follows: Analog signals outputted from detection circuits 73 and 76 which are arranged in the same manner as in the case of FIG. 7 are converted into digital signals by A/D converters 86 and 87. The digital signals thus outputted from the A/D converters 86 and 87 are compared with each other by a microcomputer 88. With the exception of this point, the arrangement of the sixth embodiment is identical with that of the fifth embodiment shown in FIG. 7.

Figure 12:
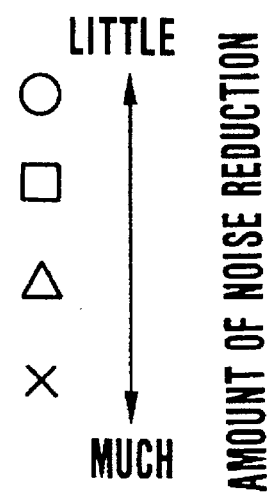
FIG. 12 shows the processing operation of a microcomputer included in the apparatus shown in FIG. 11.

The microcomputer 88 is arranged to form a control signal in an analog form in the same manner as the comparison circuit 78 of FIG. 7 on the basis of a digital signal D outputted from the A/D converter 86 and a digital signal E outputted from the A/D converter 87 and to supply the analog control signal to a variable noise reduction circuit 79. FIG. 12 shows a manner in which the control signal is formed at the microcomputer 88. In FIG. 12, the noise reduction amounts ○, □, ∆ and X for the digital signals D and E (00 to 11) outputted from the A/D converters 86 and 87 are indicated in a truth table. As shown, the noise reduction amount increases in the order of ○, □, ∆, X. The same advantageous effect as the fifth embodiment shown in FIG. 7 can be attained by the arrangement shown in FIG. 11. The arrangement thus enables the sixth embodiment to adequately carry out a signal processing action on the video signal.

The embodiment is arranged, as described above, to adequately carry out the signal processing action on the video signal reproduced from a recording medium and to be capable of displaying an adequately reproduced video image on a TV monitor device or the like.

What is claimed is:

1. A composite video color signal reproducing apparatus for reproducing a composite color video signal from a recording medium having a record of the composite video signal formed by frequency multiplexing a frequency modulated luminance signal with a low-band-converted chrominance information signal which has a different frequency band from that of the frequency modulated luminance signal, comprising:

a) reproducing means for reproducing the composite color video signal recorded on the recording medium and outputting the reproduced color video signal;

b) first detecting means arranged to extract the frequency modulated luminance signal from the composite color video signal output from said reproducing means, to perform a detecting action on the frequency modulated luminance signal extracted and to output a first detection signal;

c) second detecting means arranged to extract the low-band-converted chrominance information signal from the composite color video signal output from said reproducing means, to perform a detecting action on the low-band-converted chrominance information signal extracted and to output a second detection signal; and d) correcting means arranged to compare the first detection signal output from said first detecting means with the second detection signal output from said second detecting means and to correct the frequency characteristic of the composite color video signal output from said reproducing means or to lessen a noise component generated in the composite color video signal according to the result of the comparison.

2. An apparatus according to claim 1, wherein said correcting means includes holding means for holding the result of comparison between the first detection signal and the second detection signal.

3. A composite information signal reproducing apparatus for reproducing a composite information signal from a recording medium having a record of the composite information signal formed by frequency multiplexing a frequency modulated luminance signal with a frequency modulated audio signal which has a different frequency band from that of the frequency modulated luminance signal, comprising:

a) reproducing means for reproducing the composite information signal recorded on the recording medium and outputting the reproduced information signal;

b) first detecting means arranged to extract the frequency modulated luminance signal from the composite information signal output from said reproducing means, to perform a detecting action on the frequency modulated luminance signal extracted and to output a first detection signal;

c) second detecting means arranged to extract the frequency modulated audio signal from the composite information signal output from said reproducing means, to perform a detecting action on the frequency modulated audio signal extracted and to output a second detection signal; and d) correcting means arranged to compare the first detection signal output from said first detecting means with the second detection signal output from said second detecting means and to correct the frequency characteristic of the composite information signal output from said reproducing means or to lessen a noise component generated in the composite information signal according to the result of the comparison.

4. An apparatus according to claim 1, wherein said correcting means includes holding means for holding the result of comparison between the first detection signal and the second detection signal.

5. A frequency modulated video signal reproducing apparatus for reproducing a frequency modulated video signal from a recording medium having a record of the frequency modulated video signal formed by frequency modulating a video signal which includes synchronizing signals, comprising:

a) reproducing means for reproducing the frequency modulated video signal recorded on the recording medium and outputting the reproduced video signal;

b) first detecting means arranged to extract a signal of the video period of the frequency modulated video signal output from said reproducing means, to perform a detecting action on the signal extracted and to output a first detection signal;

c) second detecting means arranged to extract a signal of the synchronizing period of the frequency modulated video signal output from said reproducing means, to perform a detecting action on the signal extracted and to output a second detection signal; and d) correcting means arranged to compare the first detection signal output from said first detecting means with the second detection signal output from said second detecting means and to correct the frequency characteristic of the frequency modulated video signal output from said reproducing means or to lessen a noise component generated in the frequency modulated video signal according to the result of the comparison.

6. An apparatus according to claim 5, wherein said correcting means includes holding means for holding the result of comparison between the first detection signal and the second detection signal.

* * * * *

UNITED STATES PATENT AND TRADEMARK OFFICE
CERTIFICATE OF CORRECTION

PATENT NO. : 5,493,412
DATED : February 20, 1996
INVENTOR(S) : Shinichi Koyama, et al.

It is certified that error appears in the above-indentified patent and that said Letters Patent is hereby corrected as shown below:

Col. 4, line 10, change "Signal" to -- signal --.

Col. 8, line 18, change "switch." to -- switch --.

Col. 14, line 28, change "1" to -- 3 --.

Signed and Sealed this

Sixth Day of August, 1996

*Attest:*

BRUCE LEHMAN

*Attesting Officer*         *Commissioner of Patents and Trademarks*